United States Patent [19]

Ookuma et al.

[11] Patent Number: 4,672,551
[45] Date of Patent: Jun. 9, 1987

[54] DIE MACHINING APPARATUS IN AUTOMATIC PROGRAMMING

[75] Inventors: Tadashi Ookuma; Shigeshi Murata, both of Abikoshi, Japan

[73] Assignee: Hitachi Seiki Co., Ltd., Tokyo, Japan

[21] Appl. No.: 732,708

[22] Filed: May 10, 1985

[30] Foreign Application Priority Data

Jun. 27, 1984 [JP] Japan ................................. 59-132404

[51] Int. Cl.$^4$ ........................ G06F 15/46; G05B 19/18
[52] U.S. Cl. .................................... 364/474; 318/578; 318/579; 364/171
[58] Field of Search ........ 364/474, 475, 520, 167–171; 318/571, 578, 579

[56] References Cited

U.S. PATENT DOCUMENTS

| 4,355,362 | 10/1982 | Imazeki et al. | 318/579 X |
| 4,370,722 | 1/1983 | Imazeki et al. | 318/578 X |
| 4,456,864 | 6/1984 | Imazeki et al. | 318/578 |
| 4,535,408 | 8/1985 | Kishi et al. | 318/579 X |
| 4,599,022 | 7/1986 | Yamazaki | 318/578 X |

Primary Examiner—Joseph Ruggiero
Attorney, Agent, or Firm—Cushman, Darby & Cushman

[57] ABSTRACT

This invention has improved the automatic programming method which is used for machining the configuration of a curved surface of a die. The values of X and Y coordinates are calculated by a machining path production device through a curved surface configuration storage device. The value of Z coordinate in the third dimension is obtained by a machining point calculation device. If a curved surface in the Z axis is to be machined two or more times, a judgement circuit decides this and a calculation processing device calculates that the first machining is to be conducted in conformity with the curved surface and the second or later machining is to be skipped for rapid feeding, this decision being stored in a tool path data storing device.

1 Claim, 10 Drawing Figures

FIG. 1 PRIOR ART (A)

DIE MACHINING APPARATUS IN AUTOMATIC PROGRAMMING

BACKGROUND OF THE INVENTION

1. Field of the Invention

This invention relates to a die machining apparatus in automatic programming which is applied when a die is machined from a work material by a machine tool, particularly a vertical type machining center.

2. Description of the Prior Art

Conventionally, when a work material as shown in FIG. 5 at A is machined to have the curved surface of a die such as is shown in FIG. 5 at B, in most cases, what is called a clamping cutting method has been applied. This is a method of setting a cutting depth and cutting a work several times by a vertical machining center using a ball end mill having a ball-shaped cutting edge.

The clamping cutting method is, however, inconvenient in the present state of the art. That is, since the length of the blade of the ball end mill is usually about 3 to 5 times the diameter of the ball, it is impossible to cut deeper than the length of the blade, and even when cutting to a depth which is less than the length of the blade, the available cutting force does not allow for cutting to a desired depth to be accomplished in one operation.

Therefore, several machining steps are required in order to obtain the final configuration of the curved surface of a die. For example, machining is conducted as is shown by models in FIG. 6a–6c in accordance with three steps from (C) to (E), thereby forming the traces of a tool, as is shown in (c).

The above-described method of machining in three steps, which is shown in FIGS. 6a–6c is disadvantageous in that the portion which is to be completed in conformity with a desired curved shape is subjected to repeated machining, which is a waste of time and means that the total machining time cannot be shortened.

SUMMARY OF THE INVENTION

Accordingly it is an object of the invention to solve the above-described problems and to provide a die machining apparatus in automatic programming which can avoid any waste of time and enables an efficient cutting process without repeated cutting of the curved portion.

To achieve this aim, this invention has improved the automatic programming method which is used for machining the configuration of a curved surface of a die. The values of X and Y coordinates are calculated by a machining path production device through a curved surface configuration storage device. The value of Z coordinate in the third dimension is obtained by a machining point calculation device. If a curved surface in the Z axis is to be machined two or more times, a judgement circuit decides this and a calculation processing device calculates that the first machining is to be conducted in conformity with the curved surface and the second or later machining is to be skipped for rapid feeding, this decision being stored in a tool path data storage device.

The above and other objects, features and advantages of the present invention will become clear from the following description of the preferred embodiment thereof, taken in conjunction with the accompanying drawings.

BRIEF DESCRIPTION OF THE DRAWINGS

FIG. 6($b$) is a view of a model of machining in the Z axis in the third dimension; and FIG. 6($c$) shows the traces of a tool which is used for machining.

DESCRIPTION OF THE PREFERRED EMBODIMENT

Hereinunder an embodiment of a machining device according to the invention will be described in detail with reference to the accompanying drawings.

Figure 1:
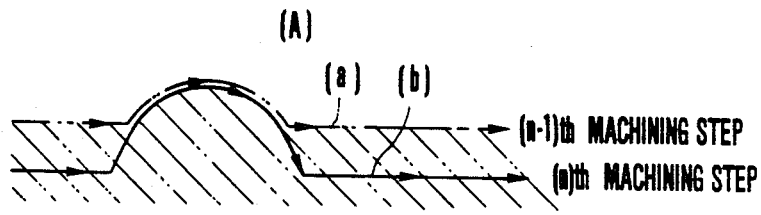
FIG. 1(A) is a view of a conventional machining method.
FIG. 1(B) is a view of a machining method according to the present invention.
Figure 1:
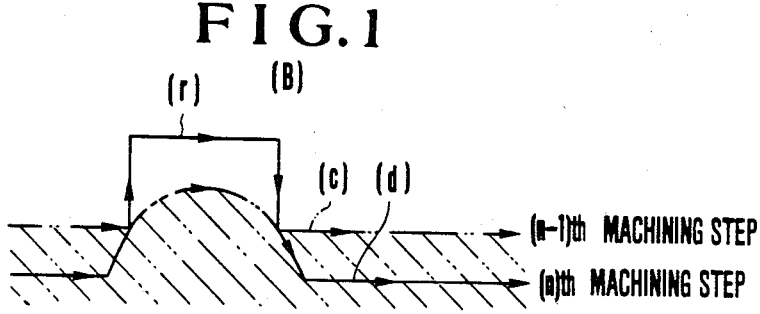

FIGS. 1(A) and 1(B) are views of models for comparison between and explanation of a conventional machining method and a machining method according to the invention. Referring first to FIG. 1(A) showing the conventional machining method, in the $(n-1)$th machining step the curved portion is cut along the machining line (a) (indicated by the two-dot and dash line) in the direction indicated by the arrow. In the $(n)$th machining step when the work is to be cut along the machining line (b), profile copy machining is also conducted duplicatingly on the curved portion for which cutting has been finished in the previous machining.

Referring next to FIG. 1(B) which illustrates the machining method using a die machining apparatus according to the invention, in the $(n-1)$th machining step the curved portion is cut along the machining line (c) (indicated by the two-dot dashed line) in the direction indicated by the arrow. Thereupon, when the $(n)$th machining is conducted, the work is cut only along the machining line (d) while the copy machining of the curved portion for which cutting was finished in the $(n-1)$th machining step is skipped for rapid feeding, as is shown by the arrow (r).

A concrete method of conducting the automatic programming which carries out the $(n)$th cutting step in which cutting process is conducted with a rapid feeding as is indicated by the arrow (r) without following the curved portion will be explained with reference to FIG. 2.

Figure 2:
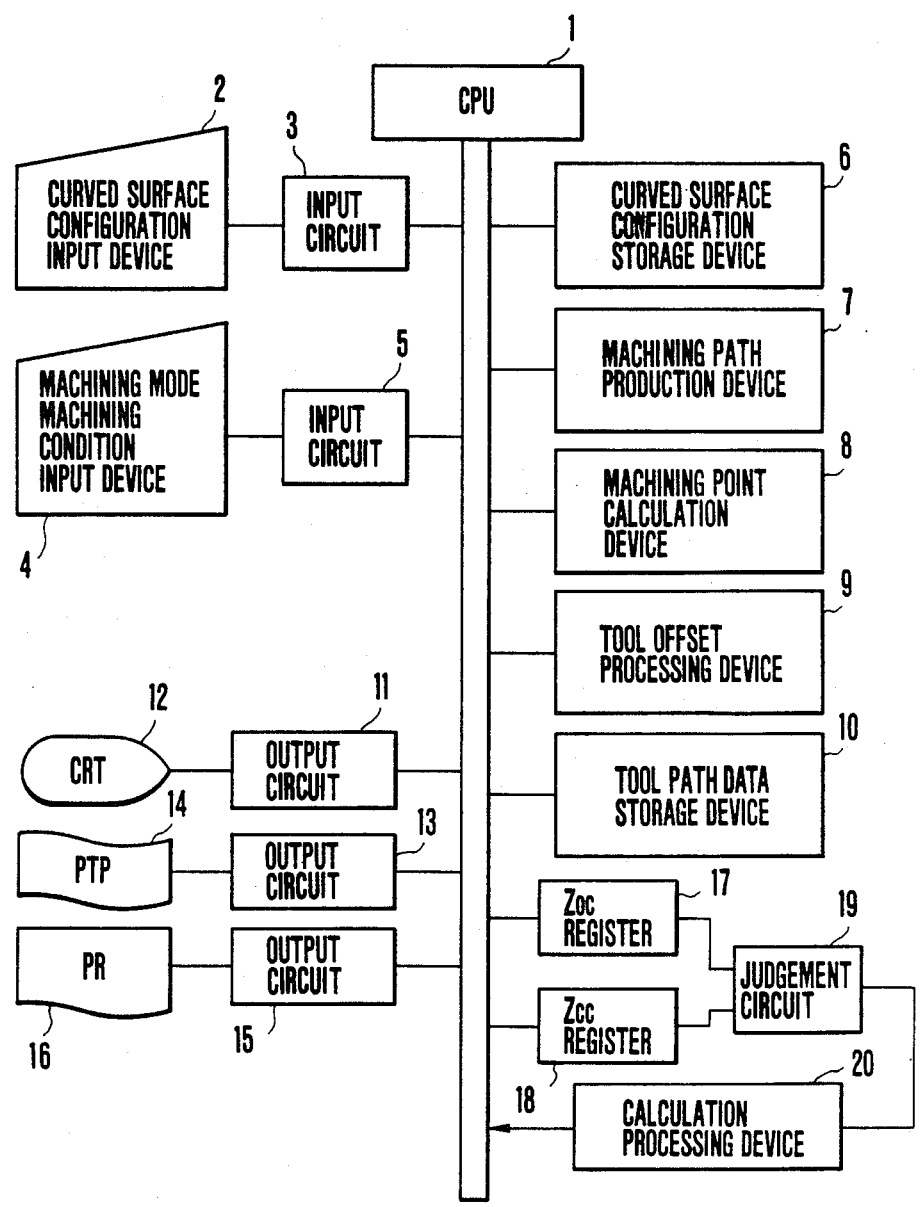
FIG. 2 is a flow diagram showing the control system of the die machining apparatus in automatic programming according to the invention.
Figure 3:
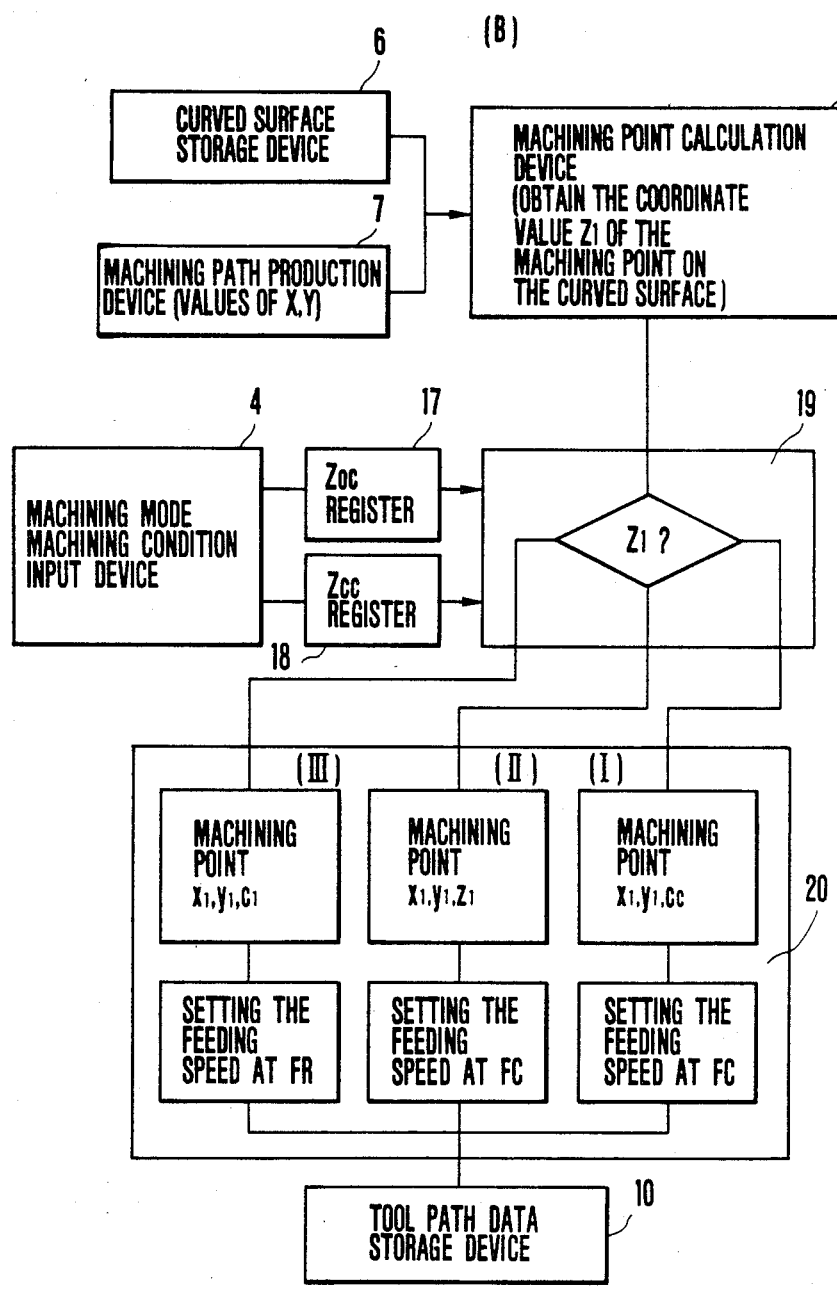

FIG. 2 is a flow diagram of a control system of the die machining apparatus in automatic programming conducted according to the invention.

In FIG. 2, the data in respect of the configuration of a curved surface which is now to be machined, for example, the data of the configuration of the curved surface which is shown in FIG. 3(A), is loaded into a CPU 1 by a curved surface configuration input device 2 through an input circuit 3. The data of machining modes, for example a machining direction such as right, left, vertical or horizontal direction, and the data of machining conditions such as the radius, pitch, or type of a tool are loaded into a CPU 1 by a machining mode and machining condition input device 4, and are input through an input circuit 5.

The data which are input from the curved surface configuration input device 2 are stored in a curved surface configuration storage device 6 after they are processed by the CPU 1.

The curved surface to be machined is projected to a machining path production device 7 on the basis of the machining modes and machining conditions input from the machining mode and machining condition input device 4 and the machining path of the curved surface is read as two dixensional values of X and Y coordinates.

The point of the X and Y coordinates which is obtained by the machining path production device 7 is calculated and converted into a three dimensional point Z by a machining point calculation device 8.

The point Z which is obtained by the machining point calculation device 8 is corrected by a tool offset processing device 9 so as to represent path data for the actual tool trace, namely an NC data. The tool path data which is corrected by the tool offset processing device 9 is temporarily stored in a tool path data storage device 10.

The tool path data which is stored in the tool path data storage device 10 is displayed on a CRT display device 12 through an output circuit 11, is output to a PTP (paper tape punch) 14 through an output circuit 13, or is output to a PR (printer) 16 through an output circuit 15, and the work is thereby cut into the predetermined configuration of the curved surface by a machine tool such as a vertical machining center.

In the machining apparatus according to the invention, two registers 17, 18, a judgement circuit 19, and a calculation processing device 20 are connected at the point Z which is obtained by the machining point calculation device 8, whereby the necessity for rapid feeding is judged and calculated so as to machine the work while skipping the curved portion where machining has already been finished. The concrete method whereby the curved portion is skipped will be explained with reference to FIG. 3.

FIG. 3(A) shows the point Z where die machining is conducted as a continuous curve of a cross section, and in the coordinates, the ordinate denotes the value of Z and the abscissa an arbitrary cross section of the two dimensional coordinates X and Y. The machining line in the (n−1)th order is a machining line consisting of a straight line (a)-(b), a curve (b)-(c) and a straight line (c)-(d) and machining has already been finished. A machining line which is the machining line in the (n)th order consists of a straight line (e)-(f), curves (f)-(b), (b)-(c) and (c)-(i) and a straight line (i)-(j). At this time, the values $Z_1$ of the curve which is to be finally formed are continuously judged and calculated in accordance with a flow diagram of control operation as shown in FIG. 3(B).

When cutting along the (n)th machining line, the values Z as referred to the (n−1)th machining level $Z_{oc}$ and the values Z as referred to the (n)th machining level $Z_{cc}$ are first read into the $Z_{oc}$ register 17 for machining level $Z_{oc}$ and the $Z_{cc}$ register 18 for machining level $Z_{cc}$ and machining is executed while comparing and judging those values. That is, in the case of cutting from the straight line (e)-(f) to (i)-(j) along the (n)th machining level $Z_{cc}$, since the point $Z_1$ of the curve which is to be finally formed is $<Z_{cc}$ in the ranges of the straight lines (e)-(f) to (i)-(j), which case corresponds to (I) in FIG. 3(B), the straight lines (e)-(f) and (i)-(j) are machined at the cutting depth of $C_c$ and at a feeding speed FC (the portion indicated by the numeral (1) in FIG. 3(A)).

When $Z_{cc} \leq Z_1 \leq Z_{oc}$, which corresponds to (II) in FIG. 3(B), cutting is executed following the curves (f)-(b) and (c)-(i) at the cutting depth of $Z_1$ and at a feeding speed FC (the portion indicated by the numeral (2) in FIG. 3(B)).

In the case of $Z_1 > Z_{oc}$, which corresponds to (III) in FIG. 3(B), cutting is executed without following the curve (b)-(c) but skipping it to the point (c) via the route (b)-(g)-(h)-(c) at the level $C_1$ in the coordinate Z and at a feeding speed of FR, which is higher than FC.

In this way, when the coordinate values $Z_1$ are a curved line and requires several steps of machining, the curved line which has already been machined is not duplicated but is skipped for rapid feeding, thereby allowing speedup in cutting to be achieved.

Figure 4:
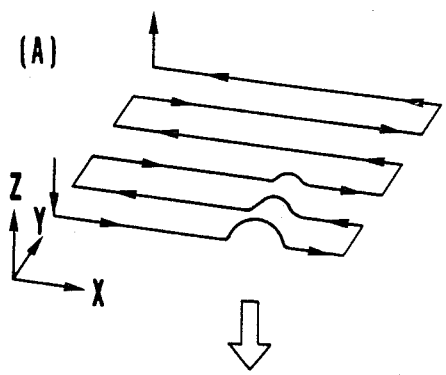
FIG. 4 shows the traces of a tool which is used for machining according to the invention.
Figure 4:
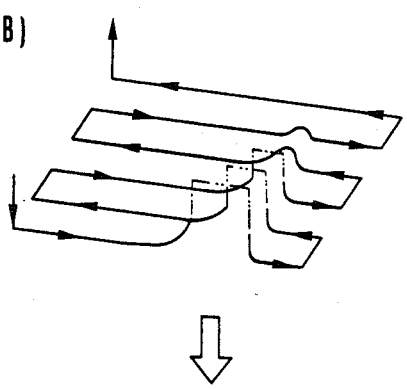
Figure 4:
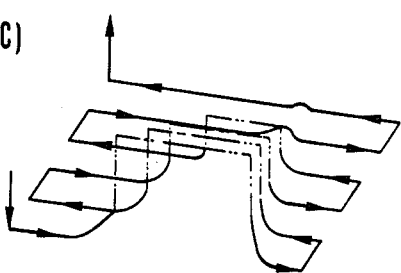
Figure 5:
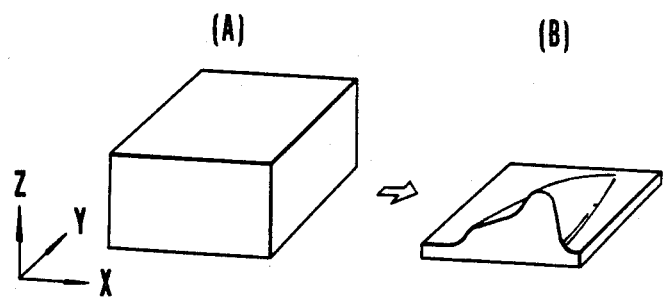
FIG. 5 is a view of models of a conventional method of machining a work material into the configuration of a curved surface of a die.
Figure 6:
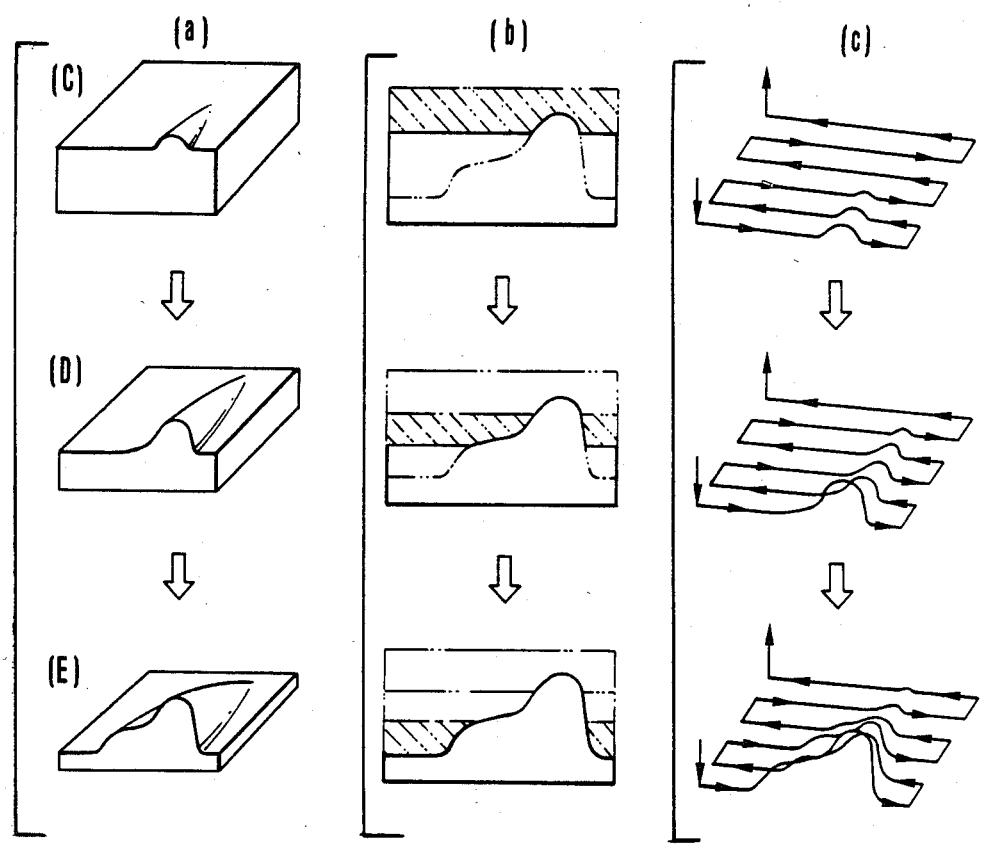
FIG. 6($a$) is a perspective view of die machining.

FIG. 4 shows the traces of a tool in the invention. In the (n−1)th step of machining, as is shown in FIG. 4 at (A), the trace follows the curve, and in the (n)th and (n+1)th steps, as is shown in FIGS. 4 at (B) and (C), the trace jumps the duplicated curved portion and travels linearly at a rapid rate of feeding.

Figure 3:
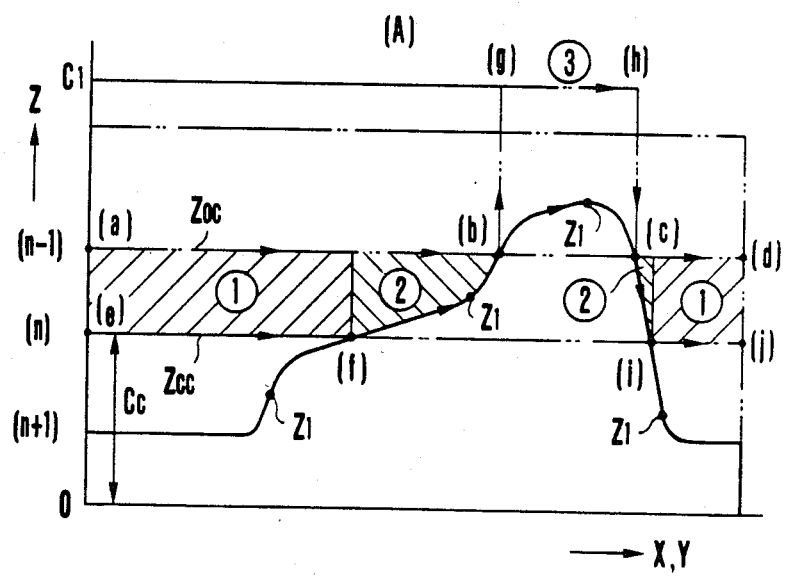
FIG. 3(A) shows a curve of points $Z_1$ in the Z axis in the third dimension which represents the points of a die to be machined, the curve bieng a model curve for explaining automatic programming.
FIG. 3(B) is a flow diagram of control operation, which is the main part of the present invention.

The operation in the present invention will be explained referring to FIGS. 2 and 3.

The data of configuration of a curved surface is input into the curved surface configuration input device 2 and the data of machining modes and machining conditions are input into the machining mode and machining condition input device 4. The data of the configuration of the curved surface is stored in the curved surface configuration storage device 6 and at the same time it is calculated and converted into the values of the coordinates X and Y to which the configuration of the curved surface is projected by the machining path production device 7. A value of the coordinate Z in the third dimension is obtained by the machining point calculation device 8, and on the basis of the data which is input from the machining mode and machining condition input device 4, the judgement circuit 19 judges through the $Z_{cc}$ and $Z_{oc}$ registers 17 and 18. The calculation processing device 20 calculates and produces a program which provides that when several steps of machining are required, in other words, when a curve is divided into several portions in the coordinate Z for machining, the duplicated portion should be machined only in the first step and in the later steps it should be skipped for fast feeding. The program is stored in the tool path data storage device 10, and when a curved surface of a die is actually cut into a predetermined configuration, the program is taken out from the tool path data storage device 10 and is output to an output device such as the PTP 14, which is connected to a machine tool such as a vertical machining center, whereby die machining is executed in the appropriate manner.

As has been described above, in the automatic programming device applied to machining the configuration of a curved surface of a die or the like according to the invention, when machining in two or more machining steps a curved surface which forms a curve which is duplicated in the direction of the coordinate Z, a work is machined along the curve in the first step and in the later steps the duplicated curve is skipped for fast feeding. Accordingly, this invention brings about many advantages such as a saving in wasteful cutting time, reduction of machining cost and remarkably heightened efficiency in machining.

In addition, since an apparatus according to the invention can be applied by attaching it to a conventional apparatus without any change in the programming operation, it imposes no burden on an operator.

While there has been described what is at present considered to be a preferred embodiment of the invention, it will be understood that various modifications may be made therein, and it is intended that the appended claim, covers all such modifications as fall within the true spirit and scope of the invention.

What is claimed is:

1. A die machining apparatus in automatic programming comprising:

a machining data input device for inputting data as to the configuration of a curved surface, machining modes and machining conditions;

a machining path production device for calculating two dimensional coordinate values which are projected from a curved surface configuration storage device;

a machining point calculation device for calculating three dimensional coordinate values;

a judgement circuit which decides in the case of machihing a curved surface that is duplicated in two or more machining steps that said curve is to be machined in the first step and that in later steps said curve is to be skipped for fast feeding;

a calculation processing means for calculating a machining data for each judgement produced by said judgement circuit; and an output device for outputting said data as NC data through a tool offset processing device and a tool path data storage device.

* * * * *